United States Patent [19]
Kotick et al.

[11] 3,873,516
[45] Mar. 25, 1975

[54] PROCESS FOR THE PREPARATION OF 1-[β-D-2-SUBSTITUTED-2-DEOXYRIBOFURANOSYL]-PYRIMIDINES

[75] Inventors: Michael Paul Kotick; Joseph Odo Polazzi, both of Elkhart, Ind.

[73] Assignee: Miles Laboratories, Inc., Elkhart, Ind.

[22] Filed: May 29, 1973

[21] Appl. No.: 364,701

[52] U.S. Cl. .......................................... 260/211.5 R
[51] Int. Cl. ............................................. C07d 51/52
[58] Field of Search ............................. 260/211.5 R

[56] References Cited
UNITED STATES PATENTS
3,463,850   8/1969   Shen et al. .................... 260/211.5 R
3,775,397   11/1973   Etzold et al. .................. 260/211.5 R FOREIGN PATENTS OR APPLICATIONS
45-39,705   12/1970   Japan .......................... 260/211.5 R OTHER PUBLICATIONS
Codington et al., Jour. Org. Chem." Vol. 29, p. 558, 1964.

Primary Examiner—Johnnie R. Brown
Attorney, Agent, or Firm—Myron B. Sokolowski

[57] ABSTRACT

The synthesis of 1-[β-D-2'-halogeno-2'-deoxyribofuranosyl]- and 1-[β-D-2'-mercapto-2'-deoxyribofuranosyl]-pyrimidine derivatives from corresponding 2,2'-anhydro-1-[β-D-arabinofuranosyl]-pyrimidine precursors is improved by utilization of N,N-dimethylformamide as the reaction solvent.

4 Claims, No Drawings

PROCESS FOR THE PREPARATION OF 1-[β-D-2-SUBSTITUTED-2-DEOXYRIBOFURANOSYL]-PYRIMIDINES

BACKGROUND OF THE INVENTION

Field of the Invention

This invention pertains to the preparation of derivatives of 1-[β-D-2'-substituted-2'-deoxyribofuranosyl]-pyrimidines in which the 2'-substituent is 2'-chloro, 2'-bromo, 2'-mercapto, and which are useful as antiviral agents or as intermediates in the synthesis of nucleic acid antimetabolites or antiviral compounds.

Description of the Prior Art

J. F. Codington et al. (J. Org. Chem., 29: 558 [1964]) synthesized certain 1-[β-D-2'-halogeno-2'-deoxyribo-furanosyl]-pyrimidines by reacting corresponding 2-2'-anhydro-1-(β-D-arabinofuranosyl)pyrimidines with anhydrous halogen halides in dioxane as the solvent. This synthetic method involves the use of sealed stainless steel cylinders and reaction times of about 18 hours at 75°–80°C. By this method, Codington and his co-workers synthesized the 2'-fluoro-, 2'-chloro-, and the 2'-bromo analogues of 2'-deoxyuridine. Specific reaction conditions of the process for 2'-fluoro-2'-deoxyuridine included reaction of 2'-2-anhydro-1-(β-D-arabinofuranosyl)uracil with anhydrous hydrogen fluoride in dioxane for 18 hours at 115°–120°C in a stainless steel cylinder. Similar conditions, but with hydrogen chloride and temperatures of 115°–120°C, yielded the 2'-chloro derivative. The preparation of 1-[β-D-2'-bromo-2'-deoxyribofuranosyl]-uracil involved reaction of 2'-2'-anhydro-1-(β-D-arabinofuranosyl)uracil with hydrogen bromide-saturated trifluoroacetic acid for 4 days at 20°–25°C. As will be seen, the present invention is an improvement of the above process.

The 2,2'-anhydro-1-(β-D-arabinofuranosyl)pyrimidine derivatives used as starting materials in the Codington et al. method can be prepared according to the procedure reported by A. Hampton and A. W. Nichol (Biochemistry, 5: 2076 [1966]) or J. G. Moffatt and A. F. Russell (U.S. Pat. No. 3,709,874 [1973]).

The above prior art method is summarized in reaction form as follows:

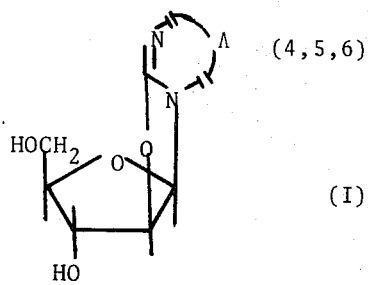

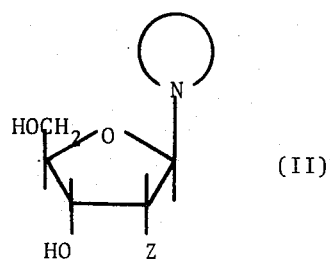

In both Formulas I and II, the following definitions apply:

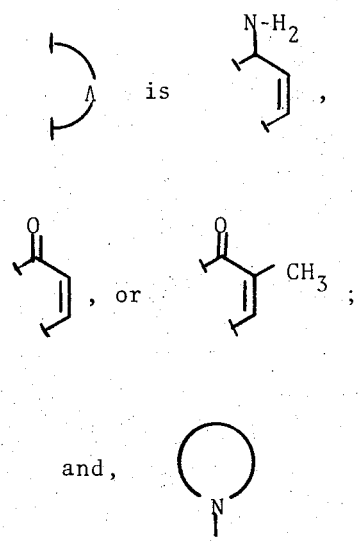

is uracil, thymine, or cytosine.

X is halide; and

Z is halo or mercapto.

SUMMARY

This invention is an improvement in the prior art method of synthesizing 1-[β-D-2'-desoxyribofuranosyl]-pyrimidine derivatives substituted in the 2'-position with halogeno or mercapto groups from corresponding 2,2'-anhydro-[β-D-arabinofuranosyl]-pyrimidine precursors.

The present improvement of the prior art method is the unexpected discovery that use of N,N-dimethylformamide (DMF) in lieu of dioxane as a solvent reduces the reaction time from about 18 hours to about 1 hour, eliminates the necessity of performing the reaction in a sealed stainless steel container, and allows the reaction to be performed in standard laboratory glassware. The invention accordingly allows economy of time and material.

The temperature at which the improved method can be performed is from 75° to 150°C, although 100°C is preferred. Although the time of the reaction is not critical, 1 hour is preferred.

In general, the improvement may be represented by the reaction:

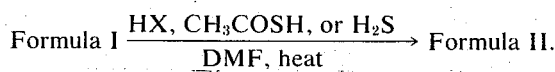

Formulas I, II and X are defined in the "Description of the Prior Art," supra. Reaction of Formula I with an anhydrous hydrogen halide in DMF yields the 2'-halogeno derivative of Formula II while reaction with hydrogensulfide or thioacetic acid yields the 2'-mercapto analogue.

A preferred embodiment of this improved process is its applicationn to the synthesis of 1-[β-D-2'-substituted-2'-deoxyribofuranosyl]-uracil,-cytosine or -thymine in which the 2'-substituent is chloro, bromo, iodo or mercapto. These latter compounds are prepared by the reaction of the corresponding 2,2'-anhydro-1-[β-D-arabinofuranosyl]pyrimidine and anhydrous hydrogen chloride, bromide, iodide, sulfide or thioacetic acid in DMF at 100°C. The following reaction sequence summarizes this preferred embodiment of the invention:

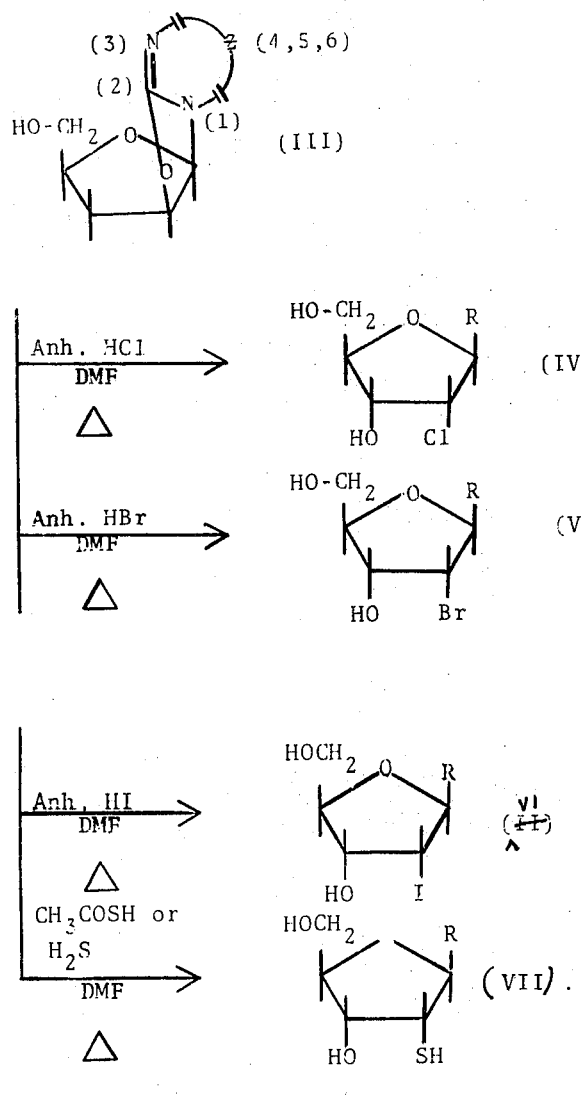

In Formulas IV through VII, R is thymine, uracil or cytosine.

Another preferred embodiment of this improved process is the synthesis of 1-[β-D-2'-chloro-2'-deoxyribofuranosyl]-or 1-[β-D-2'-bromo-2'-deoxyribofuranosyl]uracil by reacting 2,2'-anhydro-1-(β-D-arabinofuranosyl)-uracil with anhydrous hydrogen chloride or bromide in dry DMF at 100°C for 1 hour:

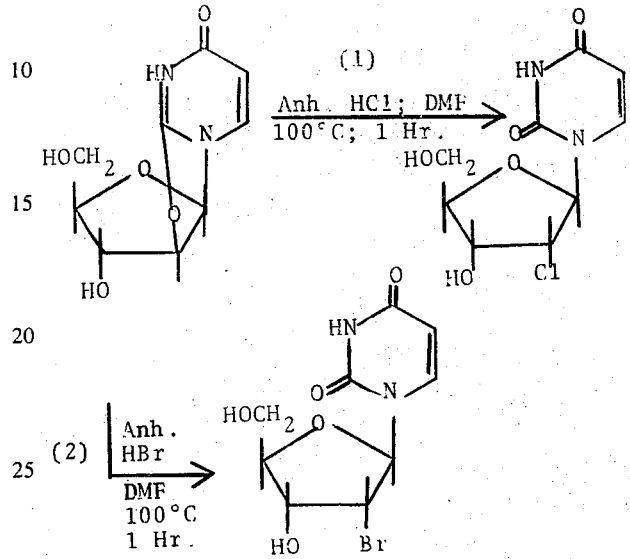

DESCRIPTION OF THE PREFERRED EMBODIMENTS

Example 1

2,2'-Anhydro-1-(β-D-Arabinofuranosyl)-Uracil

A mixture of uridine (40.0 g), diphenyl carbonate (45.6 g), sodium bicarbonate (1.6 g) and dry, distilled DMF (80 ml) was immersed in a pre-heated 150° oil bath and held at this temperature with stirring for 30 min. The dark reaction mixture was cooled and poured in a thin stream into anhydrous ethyl ether (1.4L) with continuous stirring. Stirring and trituration were continued until an amorphous mass formed. Ths mass was washed several times with additional ethyl ether, then heated with methanol (250 ml) on a steam bath for 15 min. The warm solution was filtered to give 15.7 g of a light tan product. An additional 12.3 g of product was obtained in 2 crops from the mother liquor for a total yield of 28.0 g (76%) of material suitable for further use.

In another experiment, the light tan product was purified by recrystallization from methanol (1 g/50 ml) yielding off-white crystals, m.p. 238°–242°.

Calculated for $C_9H_{10}N_2O_5$: C, 47.81: H, 4.42; N, 12.38

Found: C, 48.20; H, 4.58; N, 12.39

1-[β-D-2'-Chloro-2'-Deoxyribofuranosyl]-Uracil

To a solution of dry hydrogen chloride (4.8 g) in DMF (150 ml) was added 2,2'-anhydro-1-(β-D-arabinofuranosyl)-uracil (15 g). The suspension was immersed in a pre-heated oil bath (100°) and kept at this temperature for 30 min. with occasional stirring. The cooled mixture was then evaporated in vacuo at 50° and azeotroped several times each with benzene, then a 1:1 mixture of benzene-absolute ethanol, and finally absolute ethanol. The crystalline solid was collected, washed with absolute ethanol followed by ether and dried in air to give 10 g (57%) of 2'-chloro-2'-deoxyuridine as white crystals, m.p. 204°–206°.

Using 2 g of 2,2'-anhydro-1(β-D-arabinofuranosyl)-uracil, the yield of product was 1.53 g (66%).

Calculated for $C_9H_{11}ClN_2O_5$: C, 41.15; H, 4.21; N, 10.66
Found: C, 41.39; H, 4.17; N, 10.62

EXAMPLE 2

1-[β-D-2'-Bromo-2-Deoxyribofuranosyl]-Uracil

To a solution of dry hydrogen bromide (6 g) in dry DMF (150 ml) was added 2,2'-anhydro-1-(β-D-arabinofuranosyl)-uracil (10 g). The mixture was immersed in a 100° preheated oil bath and kept at this temperature with occasional swirling for 15 min. After cooling to room temperature, the reaction mixture was poured into cold absolute ethanol (300 ml) and neutralized by addition of $PbCO_3$. The inorganic material was removed by filtration, and the filtrate was evaporated to dryness, azeotroped with absolute ethanol until crystals formed, and cooled. The crystals were collected, washed with anhydrous ether and air-dried to give 2'-bromo-2'-deoxyuridine, 12.0 g (94%), m.p. 195°–198°C. Recrystallization from absolute ethanol (1 g/25 ml) gave analytically pure 2'-bromo-2'-deoxyuridine, m.p. 196°–198°C.

Calculated for $C_9H_{11}BrN_2O_5$: C, 35.19; H, 3.59; N, 9.12
Found: C, 34.70; H, 3.57; N, 9.40

What is claimed is:

1. An improved method for preparing a 1-(β-D-2'-substituted-2'-deoxyribofuranosyl)-pyrimidine having the formula

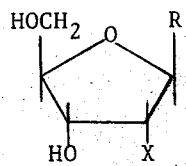

in which R is selected from the group consisting of uracil, cytosine, and thymine, and X is sulfhydryl, wherein a first reactant selected from the group consisting of 2,2'-anhydro-1-(β-D-arabinofuranosyl)-uracil, -thymine, and -cytosine is reacted with anhydrous hydrogen sulfide, wherein the improvement consists essentally of:

reacting the first reactant with the second reactant in N,N-dimethylformamide at a temperature of from about 75°C to about 150°C.

2. A method as in claim 1, wherein said first reactant is 2,2'-anhydro-1-(β-D-arabinofuranosyl)-uracil and said second reactant is hydrogen sulfide.

3. A method as in claim 1, wherein said first reactant is 2,2'-anhydro-1-(β-D-arabinofuranosyl)-thymine and said second reactant is hydrogen sulfide.

4. A method as in claim 1, wherein said first reactant is 2,2'-anhydro-1-(β-D-arabinofuranosyl)-cytosine and said second reactant is hydrogen sulfide.

* * * * *